United States Patent [19] [11] 4,062,420
Stedman [45] Dec. 13, 1977

[54] CAB, PINNED ON FOR DOUBLE ARTICULATED TRACTOR

[75] Inventor: Robert N. Stedman, Chillicothe, Ill.

[73] Assignee: Caterpillar Tractor Co., Peoria, Ill.

[21] Appl. No.: 725,641

[22] Filed: Sept. 22, 1976

Related U.S. Application Data

[63] Continuation of Ser. No. 636,500, Dec. 1, 1975, abandoned.

[51] Int. Cl.² .............................................. B62D 33/06
[52] U.S. Cl. .................................. 180/89.1; 172/436; 296/28 C
[58] Field of Search ..................... 180/89.1, 134, 135, 180/136, 137, 138, 139, 77 MC; 296/28 C; 172/793, 794, 795, 796, 797, 781, 782, 792, 431, 436, 432, 305

[56] References Cited

U.S. PATENT DOCUMENTS

| 2,564,888 | 8/1951 | Foley | 180/89.1 |
| 2,675,892 | 4/1954 | Wagner | 296/28 C X |
| 3,305,039 | 2/1967 | Molby | 180/139 |
| 3,768,856 | 10/1973 | Stuller | 296/28 C |
| 3,847,492 | 11/1974 | Kennicutt | 296/28 C |
| 3,940,177 | 2/1976 | Miers | 296/28 C X |

Primary Examiner—Joseph F. Peters, Jr.
Assistant Examiner—R. Schrecengost
Attorney, Agent, or Firm—Wegner, Stellman, McCord, Wiles & Wood

[57] ABSTRACT

In a double articulated vehicle, such as for use in low overhead clearance areas, a front and rear frame are pivotally mounted to an intermediate carriage in such a way that both frames will turn in the same direction upon actuation of the steering mechanism. A cab is removably mounted on sound suppressing shock mounts on the side of the intermediate carriage with the floor of the cab substantially coterminous with the bottom of the carriage and with the roof of the cab substantially coterminous with the highest projections on the front and rear frames. The cab will face in a direction transverse to the lengthwise centerline of the vehicle and be protected by and from the wheels on one side of the vehicle.

12 Claims, 4 Drawing Figures

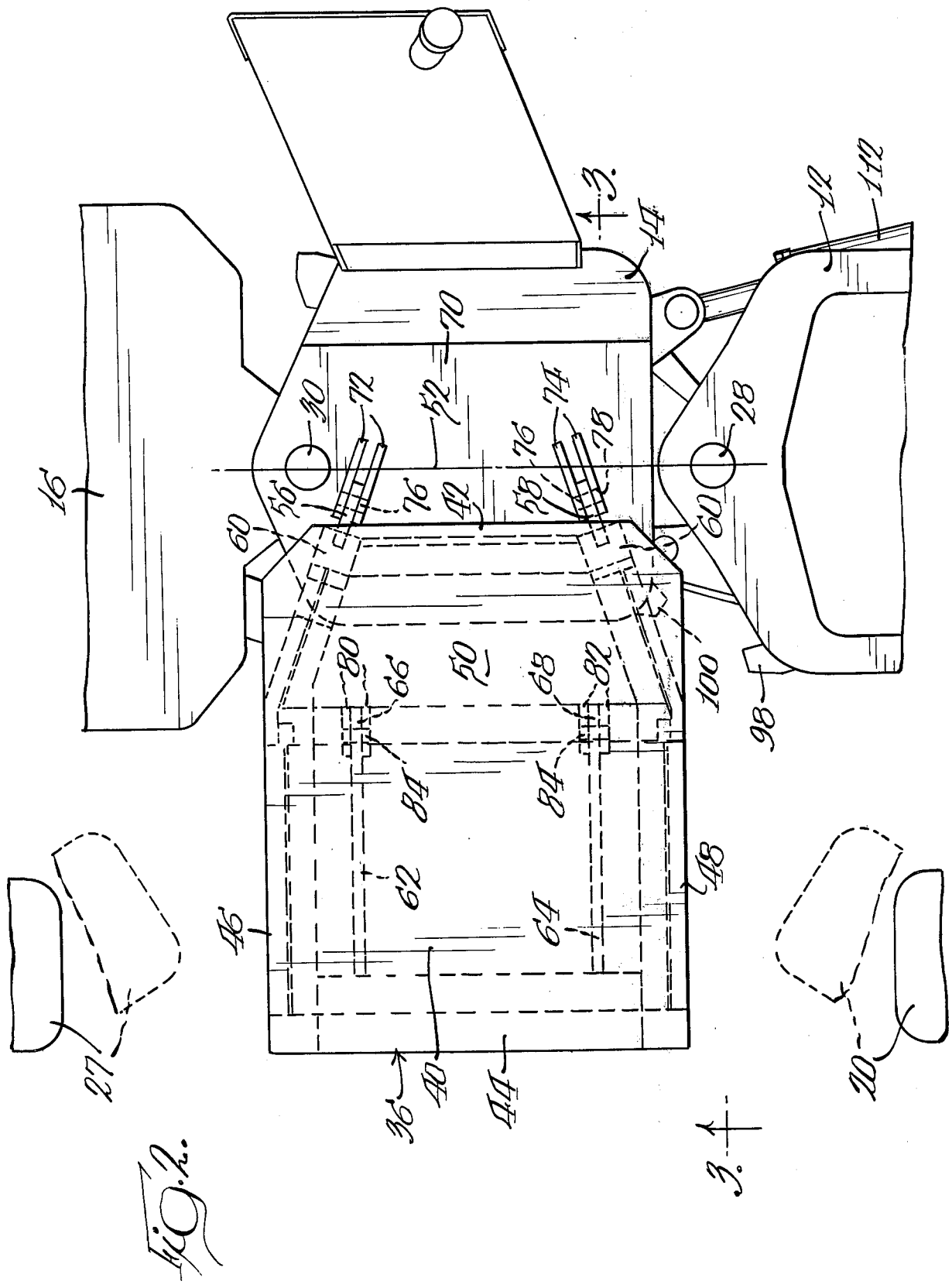

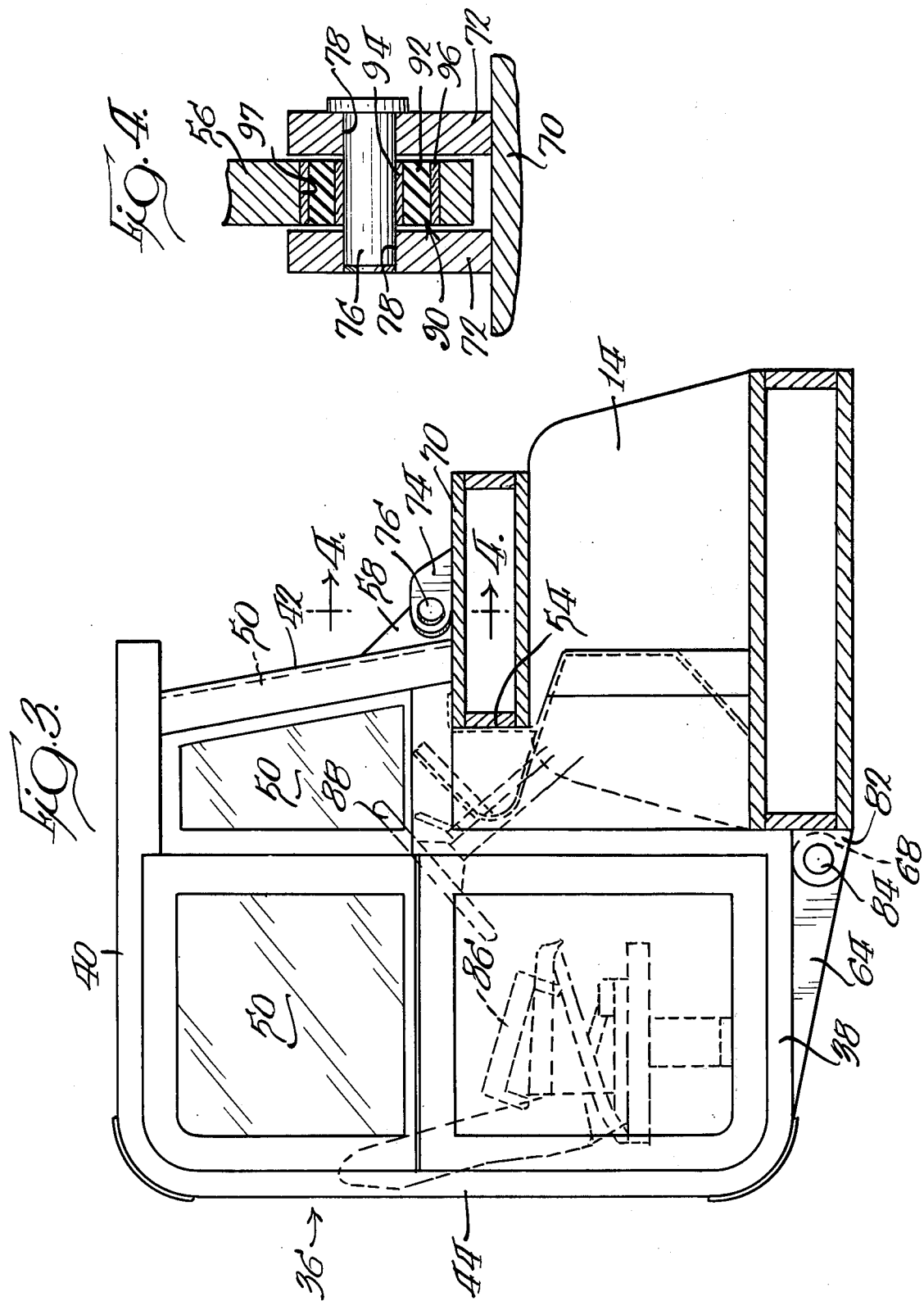

CAB, PINNED ON FOR DOUBLE ARTICULATED TRACTOR

This is a continuation of application Ser. No. 636,500 filed on Dec. 1, 1975 and now abandoned.

BACKGROUND OF THE INVENTION

1. Field of the Invention

This invention relates to vehicles and, more particularly, to a cab for side mounting on double articulated vehicles.

2. Description of the Prior Art

Vehicles, such as wheel loaders and the like, are known in the art and provide for an operator riding on a seat that projects fairly high with respect to the frame of the vehicle so as to afford the operator a broad panoramic view of the area around the vehicle. For certain applications, it is desirable to use the vehicle in an area where head clearance is relatively low. To locate the operator's seat low enough for the clearance available, the operator's line of sight is largely obstructed by the superstructure of the vehicle in such a way that he is not able to see adequately forward and rearward of the vehicle. In a single articulated vehicle of conventional design, it was not possible to locate the operator's seat low enough on the frame to be acceptable and still provide adequate visibility for the operator.

SUMMARY OF THE INVENTION

A double articulated vehicle has been provided with a rear frame, a forward frame and an intermediate or center carriage with the forward and rearward frames being pivotally mounted to the intermediate carriage. An operator's cab is mounted on sound suppressing shock mounts on the side of the intermediate carriage with the top of the cab substantially coterminous with the highest projection from either the front or rear frame of the vehicle. The cab is designed in such a way that it is somewhat protected by the wheels of the vehicle and, even when the vehicle is turned with its maximum radius in the direction of the cab, the wheels of the vehicle will not contact the cab and, in fact, will protect the cab on that side. The cab is mounted within the turning radius of the vehicle which provides protection for the cab.

The cab is mounted to the intermediate carriage by resilient shock absorbing members which suppress noise and vibrations, thereby making the cab more comfortable during use.

The cab is positioned so that the operator faces in a direction perpendicular to the longitudinal axis of the vehicle. In this position, the operator is able to see both forward and rearward of the vehicle and, since vehicles of this type are used to move and perform work operations both forward and rearward during a work cycle, the clear forward and rearward visibility for the operator is of a great assist in operating the vehicle. Even though the cab is located below the upper structural limits of the vehicle, because of its location on the side of the vehicle, the visibility of the operator is not obstructed. The cab is pinned at four points to the side of the intermediate carriage through shock absorbing mounts which not only provide sound deadening for the cab, but also makes it possible to easily remove the cab as part of a system of modularizing the vehicle ready for quick disassembly for lowering, for instance, into a mine or other area with restricted overhead clearance.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 2 is a partial enlarged plane view of the vehicle of FIG. 1 showing the mounting of the cab on the intermediate carriage of the vehicle;

FIG. 3 is a cross-sectional view taken along the lines 3—3 of FIG. 2; and,

FIG. 4 is a cross-sectional, enlarged view taken along the lines 4—4 of FIG. 3.

DESCRIPTION OF THE PREFERRED EMBODIMENT

Figure 1:
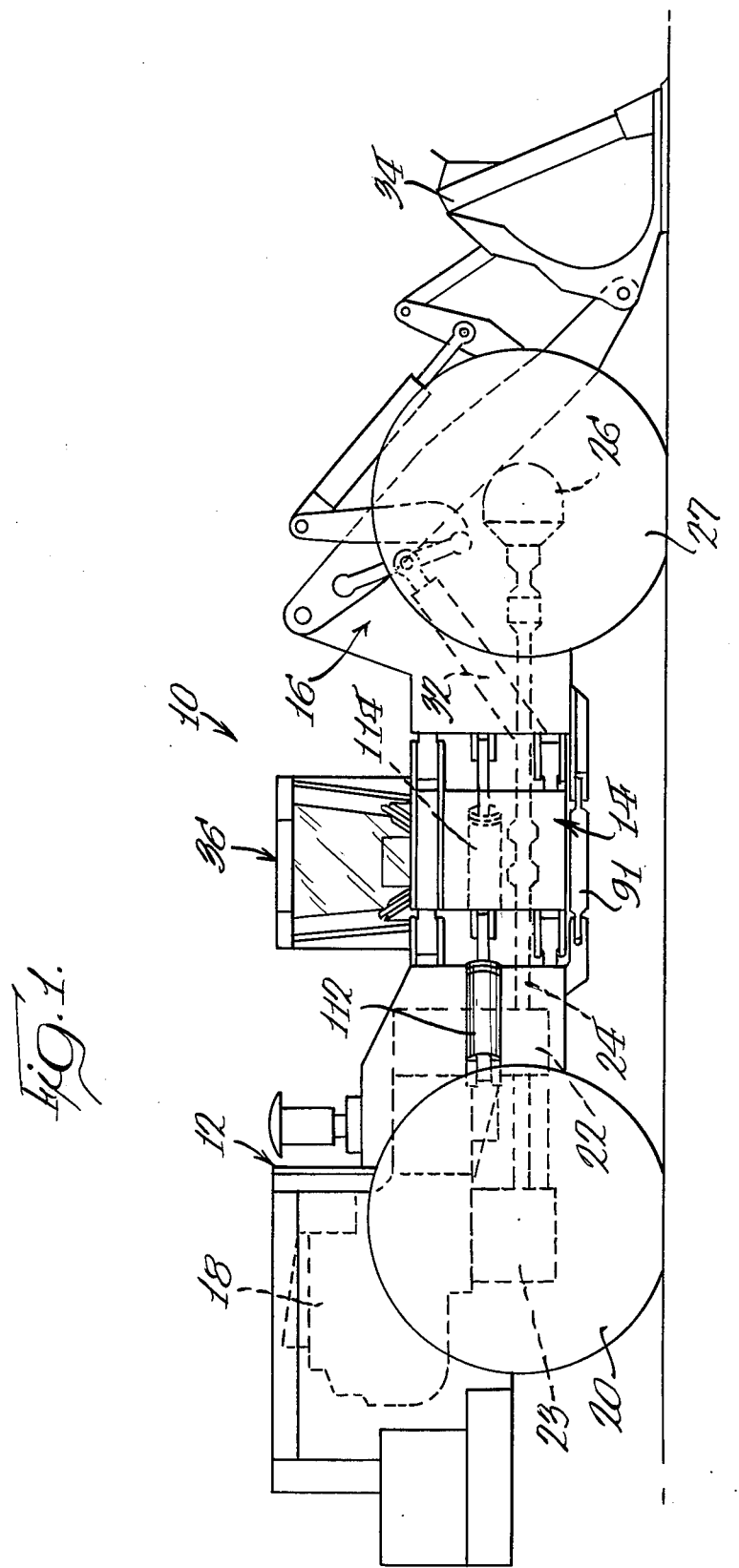
FIG. 1 is an elevational view of a wheel loader-type vehicle showing the cab of my invention located on the intermediate carriage of the vehicle.

Referring to FIG. 1, a wheel loader-type vehicle 10 is illustrated and is comprised of a rear frame 12, a center or intermediate carriage 14 and a front frame 16. It is to be understood that any double articulated vehicle could be used with the present invention.

The rear frame 12 supports an engine 18 for driving a pair of wheels 20 through a transmission 22 and differential 23. A drive line 24 from the transmission 22 passes through the open center of the intermediate carriage 14 and is connected to the differential 26 of the front frame 16 for driving the front wheels 27 on said front frame 16. The intermediate carriage 14 is pivotally connected by vertically aligned king pins 28 to the rear frame 12 and by vertically aligned king pins 30 to the front frame 16. The front frame 16 has a pair of hydraulic cylinders 32 (only one being shown) for raising and lowering a bucket 34, or the like.

Mounted on the left side of the intermediate carriage 14 is a removable cab 36 in which the operator is seated for operating the vehicle. The cab 36 is an approved environmental cab and is built and installed as a module to the intermediate carriage 14. The cab has a bottom or floor 38, a top or roof 40, a front wall 42, a rear wall 44 and two side walls 46, 48 and is provided with windows 50 in the front, rear and both side walls to give the operator relatively unobstructed visibility from his station within the cab. Some cabs are provided with windows in the lower halves of each side wall and in the top or roof to further provide the operator with maximum visibility. One side wall 46 or 48, or both, is provided with a door for ready access into and out of the cab 36. The cab 36 faces across the centerline of the vehicle so that the front of the cab faces in a direction perpendicular to the longitudinal axis 52 of the intermediate carriage 14 and in this position, the operator is able to look either forward or rearward of the vehicle by means of a 180 degree turning of the head.

The cab 36 has a recess 54 formed in the front wall 42 just below the middle of the wall with a pair of angularly disposed, converging mounting members or lugs 56, 58 carried by the vertical support frame members 60 on the front corners of the cab 36. The lugs 56, 58 are located approximately midway between the roof 40 and floor 38 of the cab 36. Mounted approximately midpoint of the cab 36 and below the bottom or floor 38 of the cab is a pair of elongate support members 62, 64 having forwardly extending lugs 66, 68, respectively. The supports 62, 64 and lugs 66, 68 are spaced apart from each other and are positioned inboard a short distance from the two bottom side edges of the floor 38 of the cab 36. The intermediate carriage 14 has mounted on its top surface 70, two pairs of upwardly projecting, spaced apart flanges 72, 74 angularly disposed with respect to each other. Each pair of flanges 72 and 74 are adapted to receive, therebetween, one of the lugs 56, 58 projecting from the cab 36. A pivot pin 76 passes through apertures 78 in the flanges 72 and 74 and in the lugs 56 and 58, respectively, to secure the upper portion of the cab 36 to the intermediate carriage 14. Similarly, two pairs of outwardly projecting, spaced apart flanges 80, 82 are mounted on the side of the lower portion of the intermediate carriage 14. The pair of flanges 80 are spaced from the pair of flanges 82 by an amount sufficient to receive the lugs 66, 68, respectively, projecting from the bottom of the cab 36. Pivot pins 84 pass through the flanges 80, 82 and through the respective lugs 66, 68 to secure the lower portion of the cab to the intermediate carriage 14. The combined effect of the lugs 56, 58, 66, 68 and the flanges 72, 74, 80, 82 being pinned together, is to mount the cab 36 on the side of the intermediate carriage 14.

The operator gains access to and exits from the cab 36 by means of the door located in one of the sides of the cab and the cab is provided with a seat 86 which is adjustable, up or down, as is known in the art. The forward lower regions of the cab 36 are provided with appropriate openings through which the steering apparatus 88, brakes (not shown) and other controls (not shown) for the vehicle, can readily be passed after the cab 36 has been assembled on the vehicle 10.

To reduce or eliminate the transmission of vibrations, noises and shocks from the vehicle 10 to the cab 36, special shock absorbing and sound suppressing members 90 are provided between the lugs 56, 58, 66, 68 on the cab 36 and the flanges 72, 74, 80, 82 on the intermediate carriage 14. Specifically, referring to FIG. 4, a sleeve 92 of resilient material, such as neoprene or the like, is mounted between a pair of concentric bearing sleeves 94, 96 with the larger bearing sleeve seating in an aperture 97 in each lug 56, 58, 66, 68 with the inner bearing sleeve 94 engaging the outer surface of the pin 76 passed through the aligned apertures 78 in the flanges 72. The material of the resilient sleeve 92 is such that shock loads and vibrations from the vehicle will be absorbed or dampened to a large extent before the vibration or shock reaches the cab 36. In this way, the cab 36 is insulated from the undesirable vibrations and shock generated in the vehicle 10 by the engine 18 and by the vehicle moving over rough terrain. The cab 36, a specially designed environmental cab which is provided with heating and/or air-conditioning, is intended to be substantially soundproof and is rigidly constructured so as to protect the operator against injury. The glass in the cab 36 is shatterproof and resistent to penetration by flying objects.

The cab 36, facing in a direction transverse to the axis 52 of the intermediate carriage 14, permits the operator to see forward to watch the movements and operation of the front frame 16 and bucket 34. Raising and lowering of the bucket 34 and manipulation of the bucket to move material and goods can be observed without obstruction. The intermediate carriage 14 is low, below the line of vision of the operator, so that the operator can see both sides of the bucket 34 from between the wheels 27 and actuators of said bucket. Looking out the window 50 of side wall 48 rearward of the vehicle 10, the operator can see the position of the wheels 20 and of the rear frame 12, in general, so that the rear frame 12 can be steered with confidence as to the clear nature of the path of travel of said vehicle.

The cab 36 is of such a size and is positioned on the intermediate carriage 14 in such a way, that maximum turning of the vehicle to the left, as viewed in FIG. 2, will pivot the front frame 16 and rear frame 12 relative to the king pins 30 and 28, respectively, on the intermediate carriage 14 so that the stops 98, 100, between the rear frame 12 and the intermediate carriage 14, abut each other with the wheels 20 and 27 in the dotted line position. It will be noted that the wheels do not contact the cab 36 and, in fact, will protect the cab against contact with objects from the left side during such a left turn. If the wheels clear an obstruction, the cab 36 will also clear. During a right turn, once again, the cab 36 will be in the turn radius of the wheels so that the cab will clear any obstruction that the wheels have been able to clear.

Since the top of the cab 36 is substantially coterminous with the highest projecting members on the front and rear frames, 16 and 12 respectively, and on the intermediate carriage 14, it will clear any low overhead clearance areas that the rest of the vehicle will clear. The bottom of the cab 36 is coterminous with the lower portions of the intermediate carriage 14 so that it is not likely to be sheared off by projections extending upward in the path of travel of the vehicle 10. All in all, the cab 36 is designed and mounted on the intermediate carriage 14 so as to afford maximum visibility to the operator and so as to be safe against the likelihood of being damaged or sheared from the intermediate carriage 14 by contact with passing obstructions. The cab 36 can be readily removed from the intermediate carriage 14 by disconnecting the steering apparatus 88 and braking and operating controls and removing the pivot pins 76 and 84 from the flanges 72, 74, 80, 82 and lugs 56, 58, 66, 68 whereupon the cab 36 can be lifted from the intermediate carriage 14.

The front frame 16 is operatively connected by ram 114 to the intermediate carriage 14 and the rear frame 12 is operatively connected to the intermediate carriage 14 by ram 112 with a rigid link 91 interconnecting rear frame 12 to front frame 16 all as is described and claimed in co-pending application Ser. No. 636,502 Filed Dec. 1, 1975 in the name of Robert N. Stedman and Gerald P. Simmons and assigned to the common assignee of the present application and now abandoned. The details of the construction and operation of the connection is incorporated in this application by reference and will not be described in detail herein.

I claim:

1. In a double articulated vehicle having a carriage with a top, a bottom, a front, a rear and two sides, said carriage having a longitudinal axis running lengthwise from the front to the rear thereof, a front frame pivotally connected to the front of said carriage, a rear frame pivotally connected to the rear of said carriage in line with said front frame, said pivotal connections lying on said longitudinal axis of said carriage, a pair of wheels drivingly connected to said rear frame, a pair of wheels drivingly connected to said front frame, and means for interconnecting said front and rear frames for simultaneous turning, in combination a cab having a front window and side windows, means for removably mounting said cab on one of said sides of said carriage with said front window facing transverse to said longitudinal axis of said carriage, said cab having an upper extremity defined by the upper extremities of said front window and said side windows which upper extremity lies in a plane that is substantially coterminous with the highest fixed projection on the vehicle.

2. In a double articulated vehicle as claimed in claim 1 wherein said means for mounting the cab is a plurality of interfitting pairs of flanges and lugs, a pin passing through each pair of flanges and each lug for pinning said flanges and lugs together, and a sound suppressing, shock absorbing member surrounding the pin and spanning between said pin and said lug whereby noise and shock from the carriage will not be transmitted from the pin to the cab.

3. In a double articulated vehicle as claimed in claim 2 wherein each one of said members has a pair of concentric sleeves with a resilient material bonded between said sleeves.

4. In a double articulated vehicle as claimed in claim 1 wherein said means comprises four pairs of flanges on said carriage and four lugs on said cab, each pair of flanges bracketing one of said lugs, sound suppressing, shock absorbing means mounted in each lug and a pin passing through said flanges and through said last-named means whereby sound and shock are not transmitted from said vehicle to said cab.

5. In a double articulated vehicle as claimed in claim 1 wherein said cab is mounted on said one side of said carriage between one wheel on the rear frame and one wheel on the front frame in such a way as to be located within the turning radius of said vehicle without said wheels contacting said cab.

6. A double articulated vehicle having a carriage with a longitudinal axis running the length thereof, said carriage having two sides lying substantially parallel to said longitudinal axis, a front frame pivotally connected to said carriage, a rear frame pivotally connected to said carriage, a cab having operator enclosing sides with the upper edges of said enclosing sides defining an upper extremity to said cab, means for mounting said cab on one of said sides of said carriage with the front of said cab facing in a direction transverse to the longitudinal axis of said carriage, said cab having said upper extremity lying below the highest fixed structural projection on the front frame, rear frame and carriage.

7. A double articulated vehicle as claimed in claim 6 wherein said means for mounting said cab on said carriage comprises a pair of flange means affixed to the top of said carriage, a pair of lugs mounted on the front of said cab, sound suppressing, shock absorbing means carried by each of said lugs, a pin passing through each flange means and the sound suppressing and shock absorbing means in each lug for securing said cab to said carriage and means for attaching the lower portion of said cab to said carriage.

8. A double articulated vehicle as claimed in claim 7 wherein said last-named means comprises a pair of flange means on the lower portion of said carriage, a pair of lugs mounted on the lower portion of said cab, sound suppressing, shock absorbing means mounted in each of said lugs and a pin passing through each of said flange means and each of said sound suppressing, shock absorbing means for securing the lower portion of the cab to said carriage.

9. In a double articulated vehicle as claimed in claim 6 wherein said cab is mounted so that side and rear extremities lie within the turning radius of said vehicle.

10. In a double articulated vehicle as claimed in claim 6 wherein said cab is removably mounted on said carriage.

11. In a double articulated vehicle having a carriage with a pair of opposite sides, a front frame pivotally connected to said carriage, a rear frame pivotally connected to said carriage, a pair of wheels drivingly connected to opposite sides of said rear frame, a pair of wheels drivingly connected to opposite sides of said front frame, means for interconnecting said front and rear frames for simultaneous turning, a cab, means for removably mounting said cab on one of said sides of said carriage with the front of said cab facing in a direction transverse to said carriage, said last-named means comprising interfitting lugs and flanges on said cab and on said carriage, resilient means mounted in each of said lugs, and pins passing through said flanges and through said resilient means in said lugs whereby shock and sound from the vehicle will not be transmitted through said resilient means to said cab and wherein the extremities of said cab is within the outline of said front and rear frames and within the turning radius of the wheels on the side of said vehicle upon which the cab is mounted.

12. A double articulated vehicle having a carriage with a longitudinal axis running the length thereof, said carriage having two sides lying substantially parallel to said longitudinal axis, a front frame pivotally connected to said carriage, a rear frame pivotally connected to said carriage, a cab having a front, a back, and two sides with the upper edges of said front, back and sides defining an upper extremity to said cab, means for mounting said cab on one of said sides of said carriage with the front of said cab facing in a direction transverse to the longitudinal axis of said carriage, said cab having said upper extremity lying substantially coterminous with the highest major fixed projection on the front frame, rear frame and carriage.

* * * * *

UNITED STATES PATENT AND TRADEMARK OFFICE
CERTIFICATE OF CORRECTION

PATENT NO. : 4,062,420
DATED : December 13, 1977
INVENTOR(S) : Robert N. Stedman It is certified that error appears in the above-identified patent and that said Letters Patent are hereby corrected as shown below:

Column 6, line 14, after "that" insert --its--.

*Signed and Sealed this*

*Twenty-fifth* Day of *April 1978*

[SEAL]

*Attest:*

RUTH C. MASON
*Attesting Officer*

LUTRELLE F. PARKER
*Acting Commissioner of Patents and Trademarks*